P. T. SHARPLES.
PROCESS FOR SEPARATING SUBSTANCES FROM LIQUIDS.
APPLICATION FILED JUNE 28, 1919.
1,351,265.
Patented Aug. 31, 1920.
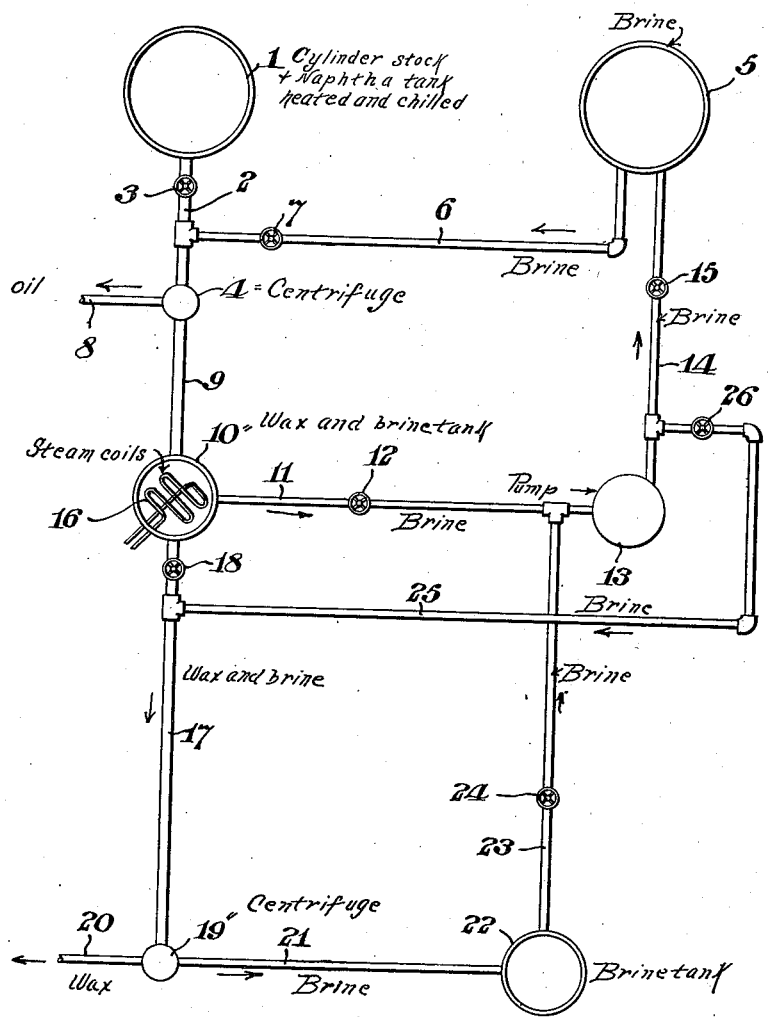
Inventor:
Philip T. Sharples,
By Chas. N. Butler
Attorney.

UNITED STATES PATENT OFFICE.

PHILIP T. SHARPLES, OF ST. DAVIDS, PENNSYLVANIA.

PROCESS FOR SEPARATING SUBSTANCES FROM LIQUIDS.

1,351,265.  Specification of Letters Patent.  Patented Aug. 31, 1920.

Application filed June 28, 1919. Serial No. 307,472.

*To all whom it may concern:*

Be it known that I, PHILIP T. SHARPLES, a citizen of the United States, residing at St. Davids, in the county of Delaware and State of Pennsylvania, have invented a certain new and useful Process for Separating Substances from Liquids, of which the following is a specification.

My invention relates primarily to the separation of a substance from a liquid in which said substance is soluble at normal temperatures and insoluble at lower temperatures, particularly to the separation of petroleum wax from petroleum liquid products, the precipitated substance and the liquid from which it is precipitated having different densities.

The process is characterized by the operations which consist in chilling the liquid product so as to precipitate the substance to be separated therefrom, and centrifuging the chilled product together with a heavier liquid substance solidifying at a temperature lower than that required to effect the specified precipitation, to effect the separation of the precipitate from the remainder of the original liquid product and the flotation of the precipitate by the heavier liquid substance.

In the application of the process to the separation of a petroleum wax from a petroleum liquid product, as cylinder stock, such product is generally diluted with naphtha, cooled by means of brine circulating in coils, or otherwise, so as to precipitate the wax, and the cooled product together with the heavier liquid, such as calcium chlorid brine, generally chilled to an equally low temperature are run through a centrifugal separator so as to effect the separation of the precipitated wax from the petroleum liquid, and carry the separated wax on the brine out of contact with the revolving separator bowl; the brine, wax and petroleum liquid from which such wax is separated being stratified by the centrifugal force to produce an outer stratum of brine, a stratum of wax directly carried thereby and a stratum of petroleum liquid directly carried by the wax. The brine maintains its requisite liquidity at the low temperature necessary for holding the wax in a state of precipitation and floats the wax in the bowl of the machine to which it would adhere otherwise.

In refining petroleum products, it is common practice to distill the crude oil by the application of fire and steam to drive off in succession naphtha, burning oils, fuel and lubricating distillates, leaving in the still a residue having usually a specific gravity from .93 to .89, a fire test of 600° F. and a solidifying point between 70 and 80° F. as determined by the "pour test". This residue, commonly used directly for lubricating steam cylinders or indirectly by compounding with other lubricants, has been treated to reduce its solidifying point by dissolving with it say one and one-half times its volume of naphtha and then chilling to precipitate the wax, which will fall to a greater or less degree through the oil, reduced in density and viscosity by its dilution. The chilling has necessarily been effected slowly, during four or five days, to prevent the wax from forming a structure which prevents it from settling in large tanks of say 10,000 barrels capacity; and the settling, at a maintained low temperature, has commonly required periods varying from three days to a month, during which time more or less of the wax precipitates and settles to the bottom, leaving a clear supernantent liquid. This liquid is drawn off and distilled to recover the naphtha, leaving a low pour test black oil. This process is known as the cold settling process. The low pour test black oil obtained from it is heated and filtered through fullers' earth to remove asphaltic and coloring matter to produce a bright, light colored oil.

The present invention, applied to cylinder stock or the residue from the original distillation specified, effects the desiderata of dispensing with a large amount of space, large as well as expensive tanks, large amounts of stock on hand, large quantities of naphtha, long periods of time, and generally secures increased economy and efficiency in the matter of plant and operation, as compared with prior practice. It effects a more thorough separation of constituents having improved properties. An increased yield of oil is obtained, amounting to about 93 to 97% as compared with the former usual yield of about 75%. Lower pour test oil is obtained than by the gravity method. The 3% to 7% of wax obtained has a higher melting point than the 25% of wax and enmeshed oil previously obtained by gravity settling. The cylinder stock can be diluted satisfactorily with a lower gravity naphtha.

Satisfactory chilling has been effected in two hours and the extreme time for the best results has been forty eight hours of gradual and uniform chilling immediately prior to centrifuging. Separations can be effected which are not practicable by a gravity process since some cylinder stocks when diluted and chilled will not separate by settling, which can be determined only after chilling as a rule.

The process is applicable not only to the cylinder stock or the specified residue obtained by distilling, but is also applicable to the removal of wax from crude oils (which is now settled over long periods of time in cold weather by certain Pennsylvania producers), to the removal of wax from lubricating stock or from lubricating and cylinder stocks combined, and in general for all removals of wax from chilled oil.

In the practice of the invention, as applied to petroleum products, calcium chlorid brine has been found highly satisfactory as a cooling and carrier liquid since it has a low freezing point at any given concentration, it is inexpensive and it has practically no effect on iron. Brine of a specific gravity of 1.22 at 60° F. and a freezing point of —24° F. is commonly used.

Various other aqueous solutions may be used as the cooling and carrier liquids, which must not freeze at the operating temperature say at —10° F. for petroleum products, which must have greater density than the precipitated wax and which must not be soluble or be negligibly soluble in the constituents making contact therewith. Examples of such liquids are the solutions of the chemical salts, sodium chlorid, sodium sulfate, sodium nitrate, ammonium sulfate and ammonium nitrate.

Specific operations involved in the practice of the invention are set forth in the following description and the accompanying drawing in illustration thereof.

The drawing illustrates, diagrammatically, structural features adapted for use in carrying out said operations.

The cylinder stock from which the paraffin is to be removed is diluted with naphtha in the proportions of about 40% of cylinder stock and 60% of naphtha and introduced into the tank (1). Here it is heated to a temperature of about 120° F. and then chilled gradually and uniformly through a period of about forty eight hours, to a temperature of say —10° F. It is then fed by gravity through the pipe (2) containing the valve (3) to the centrifuge (4). Calcium chlorid brine at a temperature of about —10° F. is fed simultaneously to the centrifuge (4), from the tank (5) through the pipe (6) controlled by the valve (7).

The oil from which the amorphous wax has been separated in the centrifuge (4) is discharged into the pipe (8). The calcium chlorid brine together with the amorphous wax separated from the oil are discharged into the pipe (9) and delivered to the wax and brine tank (10).

The wax and brine mixture in the tank (10) is allowed to settle by gravity, when the lower layer of clear brine is drawn off by gravity through the pipe (11) controlled by the valve (12) to the pump (13) by which it is delivered through the pipe (14) controlled by the valve (15) to the tank (5) for recirculation through the system.

The floating layer of wax (having some brine emulsified with it) in the tank (10) is heated by steam coils (16) to liquefy the wax and is then drawn off through the pipe (17) controlled by the valve (18) to the centrifuge (19).

The wax in this emulsion is separated in the centrifuge (19) and discharged in a clean, dry condition, free of brine, through the pipe (20). The brine in the emulsion, separated in the centrifuge is discharged in a clear, wax free condition through the pipe (21) to the brine tank (22), whence it flows through the pipe (23) controlled by the valve (24) and the pipe (11) to the pump (13), the latter forcing it through the pipe (14) to the tank (5) for recirculation.

It frequently happens that when the wax and brine mixture in the tank (10) is heated, a certain degree of gravity settling takes place so that the surface layer contains only wax and no brine. When this upper layer is fed through the centrifuge (19) it is desirable to feed some brine along with it. This is accomplished by cutting off the discharge from the pump (13) through the pipe (14) to the tank (5), by closing the valve (15), and discharging from the pipe (14) to the pipe (17) through the pipe (25) containing the now open valve (26).

Having described my invention, I claim:—

1. In the separation from a liquid of a substance soluble therein at normal temperatures and insoluble at lower temperatures, the process which consists in chilling said liquid to a temperature adapted for precipitating said substance and centrifuging the liquid containing said substance together with a liquid heavier than and immiscible with said substance, thereby separating said substance from the containing liquid, floating said substance on said heavier liquid and separately discharging said substance and the liquid from which it is separated.

2. In the separation from a liquid of a substance soluble therein at normal temperatures and insoluble at lower temperatures, the process which consists in chilling said liquid so as to precipitate said substance and centrifuging the chilled liquid containing said substance together with a heavier liquid immiscible with and having a freezing point below the temperature to which said liquid first named has been cooled, thereby separating said substance from the containing liquid, and floating said substance on said heavier liquid.

3. In the treatment of liquid petroleum products to separate their constituents, the process which consists in chilling said products and centrifuging the chilled products together with a heavier liquid aqueous salt solution, thereby separating constituents of said products and floating them on said salt solution.

4. In the treatment of liquid petroleum products to separate their constituents, the process which comprises centrifuging said products together with a heavier liquid aqueous salt solution hav'ng a temperature adapted for precipitating a constituent of said products, thereby separating constituents of said products, and separately discharging the said separated constituents.

5. In the treatment of liquid petroleum products for the separation of wax therefrom the process which comprises centrifuging said products together with a heavier liquid aqueous salt solution in which said wax is negligibly soluble thereby separating wax from the remaining petroleum products, floating off said wax by means of said heavier liquid and separately discharging the remaining petroleum products.

6. In the treatment of liquid petroleum products for the separation of wax therefrom the process which comprises centrifuging said products with calcium chlorid brine, thereby separating the wax from the remaining petroleum products, discharging the separated wax together with said brine and separately discharging the remaining petroleum products.

7. In the treatment of liquid petroleum products for the separation of wax therefrom the process which comprises centrifuging said products together with brine heavier than such products so as to separate the wax from the remaining petroleum products, discharge the wax together with the brine, settling out the bulk of the brine from the wax, and centrifuging the wax so as to separate further brine therefrom.

8. In the treatment of liquid petroleum products for the separation of wax therefrom, the process which comprises centrifuging said products together with brine so as to separate said wax and discharge it with said brine separately from the remaining petroleum products, separating said brine from said wax, and recirculating and centrifuging the separated brine with further petroleum products containing wax.

9. In the treatment of liquid petroleum products for the separation of wax therefrom, the process which comprises the dilution of cylinder stock with a light petroleum product, chilling the diluted product, centrifuging the chilled product together with brine, so as to separate wax from the remaining petroleum products and discharge the separated wax with the brine, gravity separating brine from wax discharged therewith and centrifuging the remaining brine together with the wax to effect the separation thereof.

10. In the treatment of liquid petroleum products for the separation of wax therefrom, the process which comprises the production of a mixture of said products with brine, the wax being precipitated in said mixture, and centrifuging said mixture so as to separate the wax from remaining petroleum products and separately discharging the wax and the petroleum products from which it is separated.

In testimony whereof I have hereunto set my name this 17th day of June, 1919.

P. T. SHARPLES.